United States Patent [19]

Sorimachi et al.

[11] Patent Number: 5,033,845
[45] Date of Patent: Jul. 23, 1991

[54] MULTI-DIRECTION DISTANCE MEASURING METHOD AND APPARATUS

[75] Inventors: Kanehiro Sorimachi; Tōru Jinguji, both of Yokohama; Shigeru Yamada, Chofu, all of Japan

[73] Assignee: Canon Kabushiki Kaisha, Tokyo, Japan

[21] Appl. No.: 306,248

[22] Filed: Feb. 6, 1989

Related U.S. Application Data

[63] Continuation of Ser. No. 916,727, Oct. 7, 1986, abandoned.

[30] Foreign Application Priority Data

Oct. 15, 1985 [JP] Japan ............................. 60-227832
Oct. 15, 1985 [JP] Japan ............................. 60-227833

[51] Int. Cl.$^5$ .......................... G01C 3/00; G01C 5/00
[52] U.S. Cl. ................................. 356/1; 350/6.7; 350/6.8; 356/141; 356/152
[58] Field of Search ................. 356/1, 4, 141, 152; 350/6.7, 6.8

[56] References Cited

U.S. PATENT DOCUMENTS

| | | | |
|---|---|---|---|
| 3,788,748 | 1/1974 | Knight et al. | 356/4 |
| 4,123,165 | 10/1978 | Brown et al. | 356/152 |
| 4,357,071 | 11/1982 | Mankel et al. | 350/6.8 |
| 4,486,095 | 12/1984 | Mitchelson | 356/152 |
| 4,624,528 | 11/1986 | Brueggemann | 350/6.7 |
| 4,627,734 | 12/1986 | Rioux | 356/1 |
| 4,673,817 | 6/1987 | Oomen | 356/1 |
| 4,720,632 | 1/1988 | Kaneko | 356/152 |

FOREIGN PATENT DOCUMENTS

| | | | |
|---|---|---|---|
| 0147501 | of 1985 | European Pat. Off. | 356/1 |
| 2510537 | 9/1976 | Fed. Rep. of Germany | 356/1 |

Primary Examiner—Stephen C. Buczinski
Attorney, Agent, or Firm—Fitzpatrick, Cella, Harper & Scinto

[57] ABSTRACT

A multi-direction distance measuring method including the steps of directing a light beam to an object to be measured and scanning the same, condensing the reflected light beam reflected by the object to be measured, disposing a sensor at a position at which the reflected light beam is condensed and receiving the reflected light beam by the sensor, and determining the distance to the object to be measured on the basis of the position of incidence of the reflected light beam on the light-receiving surface of the sensor. An apparatus utilizing such a method is also provided.

19 Claims, 6 Drawing Sheets

MULTI-DIRECTION DISTANCE MEASURING METHOD AND APPARATUS

This application is a continuation of application Ser. No. 916,327 filed Oct. 7, 1986, now abandoned.

BACKGROUND OF THE INVENTION

1. Field of the Invention

This invention relates to a distance measuring method and an apparatus utilizing the method. More particularly, the invention relates to a multi-direction distance measuring method and apparatus which are suitable for a visual sensor for a self-running robot or an obstacle detecting sensor for an apparatus for preventing the collision of automobiles and which can optically measure at a high speed the distance to an object to be measured extending in multiple directions.

2. Related Background Art

One example of an apparatus required to measure the distance to a surrounding object over multiple direction is a self-running robot or an apparatus for preventing collision of automobiles.

Self-running robot, measure the distance to a surrounding object over multiple directions as the means for recognizion the surrounding environment, and the robot can then run while avoiding a collision with the object on the basis of the thus obtained distance information.

Apparatus for preventing the collision of automobiles, measure the distance to a surrounding object over multiple directions as the means for detecting an obstacle, and on the basis of the thus obtained distance information, a warning is given to the driver or a signal for stopping or decelerating the automobile is produced when the automobile has approached an object, such as other automobiles or a wall beyond a predetermined distance.

One well known method for the multi-direction distance measurement as described above, comprises directing an ultrasonic wave to an object to be measured, analyzing the ultrasonic wave reflected and returned by the object to be measured and finding the distance to the object to be measured.

However, with the method of this type utilizing a sound wave, measurement is difficult when the object to be measured is small, and there has also been the problem that the resolving power is relatively low; further the measurement of the distance to an object at a great distance requires much time.

On the other hand, a method of optically accomplish multi-direction distance measurement, has been proposed which comprises projecting a slit-like light beam onto an object to be measured, measuring the shape of the bright line on the surface of the object from a direction different from the direction of projection and finding the distance from the shape of the bright line by operation.

However, in this method, there is the problem that inputting of the shape of the bright line and the operation after that requires a relatively long time.

SUMMARY OF THE INVENTION

In view of the above-noted problems peculiar to the prior art, it is an object of the present invention to provide a multi-direction distance measuring method which is capable of accomplishing high-speed measurment and an apparatus utilizing such a method.

It is a further object of the present invention to provide a distance measuring apparatus which is simple in construction and capable of readily achieving a high resolving power.

To achieve the above objectives, the multi-direction distance measuring method according to the present invention is characterized by the steps of directing a light beam to a reflecting mirror, rotating or pivoting the reflecting mirror and projecting said light beam onto an object to be measured and scanning the same, condensing the reflected light beam reflected by the object to be measured through the intermediary of the reflecting mirror, receiving the reflected light beam by a sensor disposed at a position whereat the light beam is condensed or at a position conjugate with the position, and finding the distance to the object to be measured from the position at which the reflected light is condensed on the sensor.

Further, to achieve the above objects, the multi-direction distance measuring apparatus according to the present invention is characterized in that it has a rotatable or pivotable reflecting mirror, first optical means for directing a light beam to the reflecting mirror, second optical means for again receiving through the intermediary of the reflecting mirror the reflected light beam projected onto an object to be measured through the intermediary of the reflecting mirror and scanned and reflected by the object to be measured and condensing the reflected light beam at a predetermined position, and lightreceiving means disposed at the predetermined position or a position conjugate therewith, and the distance to said object to be measured is found from the position on the light-receiving surface of the light-receiving means at which the reflected light beam is condensed.

Further features of the present invention are described in the following description of several embodiments of the present invention.

DESCRIPTION OF THE PREFERRED EMBODIMENTS

Some specific embodiments of the present invention will hereinafter be described with reference to the drawings.

Figure 1A:
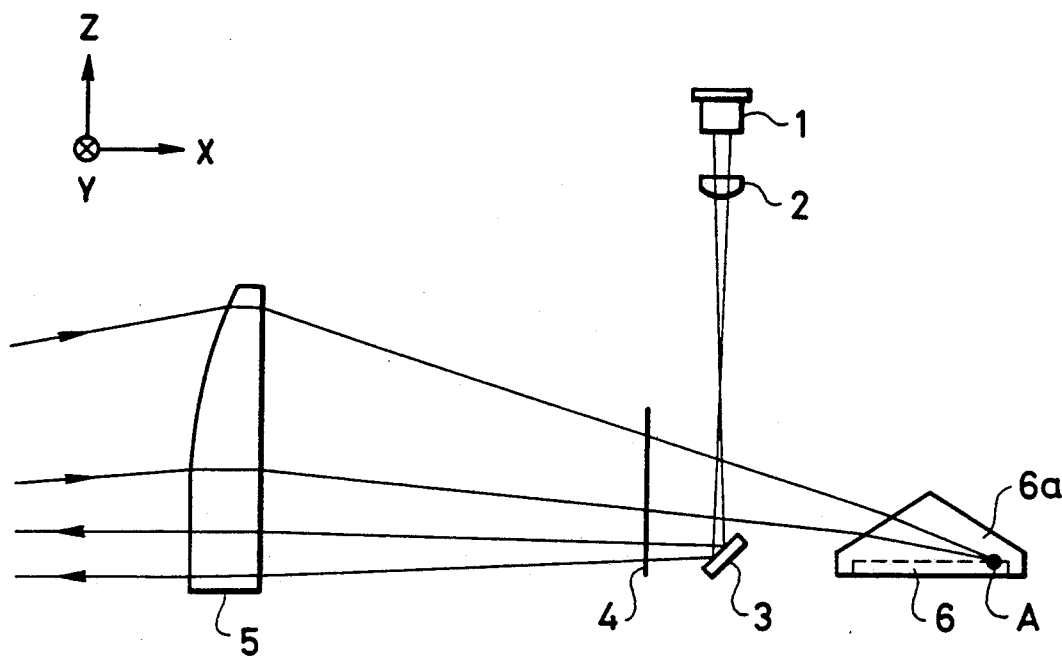
FIGS. 1(A) and 1(B) are schematic side views for illustrating an embodiment of the method of the present invention.
Figure 1B:
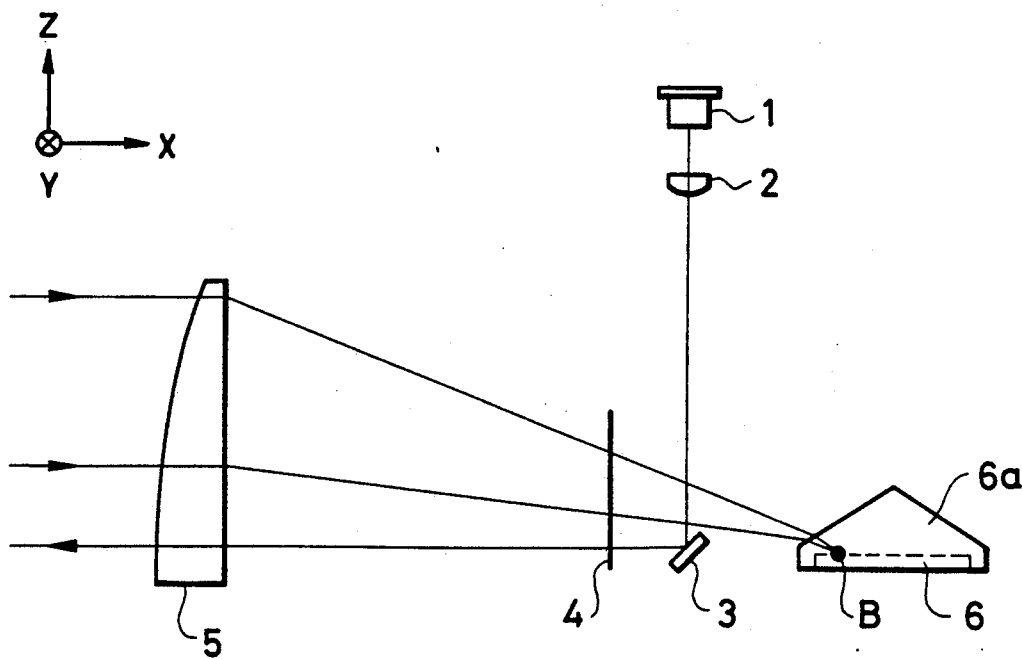
Figure 2:
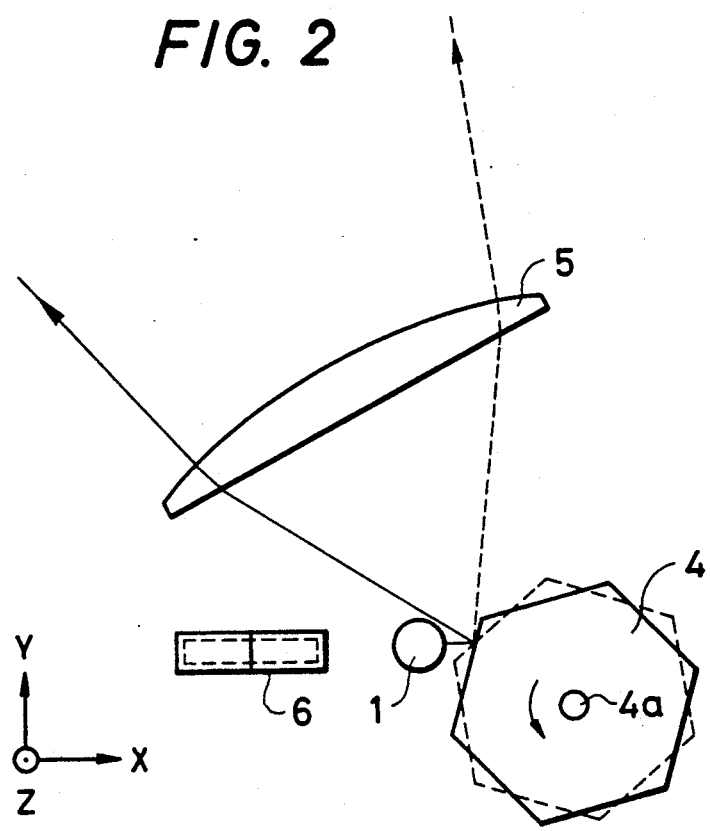
FIGS. 2 and 3 are schematic plan views thereof.
Figure 3:
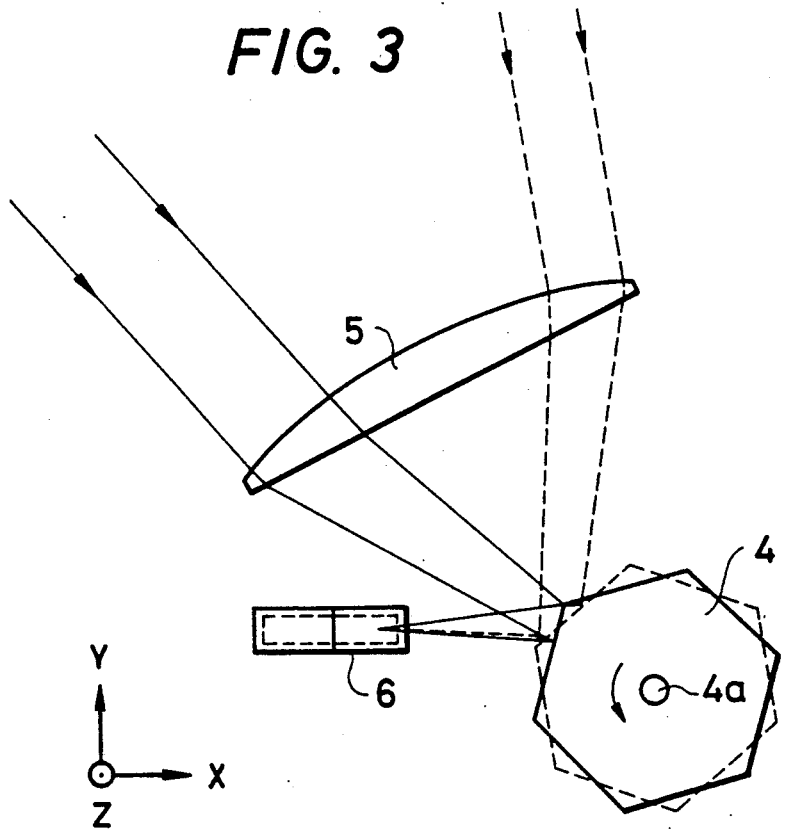

FIGS. 1(A) and 1(B) are schematic side views showing a first embodiment of the method of the present invention, and FIGS. 2 and 3 are schematic plan views thereof. In these Figures, reference numeral 1 designates a light source which may be one using a light-emitting diode or a semiconductor laser having a light-emitting portion. The light source 1 contains therein a collimator lens for collimating a light beam emitted from the light-emitting portion. Reference numeral 2 denotes a convex lens and reference numeral 3 designates a plane reflecting mirror. Reference numeral 4 denotes a rotary plane reflecting mirror and in FIGS. 1(A) and 1(B), only the plane reflecting surface thereof is indicated by a thick solid line. FIGS. 1(A) and 1(B) show, in developed views, the optical path reflected by the reflecting surface. As shown in FIGS. 2 and 3, the rotary plane reflecting mirror 4 has six plane reflecting surfaces. The reflecting mirror 4 is rotatably driven about a rotary shaft 4a, and the reflecting surfaces thereof are positioned symmetrically with respect to the rotary shaft 4a. In FIGS. 1-3, reference nemeral 5 designates a convex lens and reference numeral 6 denotes a photoelectric converting element. This photoelectric converting element is a so-called position sensor whose output signal varies in conformity with the position at which a light spot is incident, and it is located on the extension of the optical path leading from the plane reflecting mirror 3 to the rotary plane reflecting mirror 4. Also, as shown in FIGS. 1(A) and 1(B), the photoelectric converting element 6 is protected by a seal member 6a. The seal member 6a is mountain-shaped and is also effective to reduce the reflection on the inclined surface thereof of the light beam obliquely incident o the inclined surface and efficiently direct the light beam to the photoelectric converting element 6. Further, in the optical system described above, the focus position of the convex lens 2 and the focus position of the convex lens 5 are substantially coincident with each other.

A parallel light beam emitted from the light source 1 is converged at the focus position of the convex lens 5 by the convex lens 2 and is reflected by the plane reflecting mirror 3 and the rotary plane reflecting mirror 4, whereafter it passes through the convex lens 5 and becomes a parallel light beam. This parallel light beam is reflected by the surface of an object to be measured and part thereof passes through the convex lens 5 and is reflected by the rotary plane reflecting mirror 4 and is imaged. The imaging position in this case differs depending on the distance to the object to be measured. FIG. 1(A) shows a case where the object to be measured (not shown) is at a relatively short distance and in such case, the light beam is imaged on the photoelectric converting element 6 at a position A relatively distant from the reflecting mirror 4. FIG. 1(B) shows a case where the object to be measured (not shown) is at a relatively long distance and in such case, the light beam is imaged on the photoelectric converting element 6 at a position B relatively near to the reflecting mirror 4.

Accordingly, if the relation between the imaging position on the photoelectric converting element 6 and the distance to the object to be measured is found in advance, the distance to the object to be measured can be found immediately from the output of the photoelectric converting element 6.

The relation as described above can be kept substantially the same even if the reflecting mirror 4 is rotated about the rotary shaft 4a. That is, as shown in FIG. 2, the light beam emitted from the light source 1 is reflected by the reflecting mirror 4 and thereafter projected in a direction indicated by solid line when the reflecting mirror 4 is in its rotated position indicated by solid line, and said light beam is reflected by the reflecting mirror 4 and thereafter projected in a direction indicated by dotted line when the reflecting mirror 4 is in its rotated position indicated by dotted line. Also, as shown in FIG. 3, the light beam thus projected onto the object to be measured and reflected by this object is imaged on the photoelectric converting element 6 via the convex lens 5 and the reflecting mirror 4 as indicated by solid line when the reflecting mirror 4 is in its rotated position indicated by solid line, and said light beam is imaged on the photoelectric converting element 6 via the convex lens 5 and the reflecting mirror 4 as indicated by dotted line when the reflecting mirror 4 is in its rotated position indicated by dotted line. That is, irrespective of the direction in which the light beam is projected by the rotary reflecting mirror 4, part of the reflected light beam from the object to be measured is imaged on the photoelectric converting element 6. Accordingly, the distance to the object to be measured which is in a predetermined range of angle, i.e., in multiple directions, can be measured by rotating the reflecting mirror 4. When the reflecting mirror 4 is rotated, the imaging position strictly deviates in a direction perpendicular to the plane of the drawing sheet of FIGS. 1(A) and 1(B) because the reflecting mirror itself is rotated by a certain angle within the time until the reflected light from the object to be measured arrives at the reflecting surface of said reflecting mirror, but where the angular speed of the rotation of the reflecting mirror is constant, this amount of deviation can be calculated in advance, and the light beam can be imaged on the photoelectric converting element 6 by suitably moving the photoelectric converting element 6 or by interposing the plane reflecting mirror and suitably rotating this plane reflecting mirror.

According to the present embodiment, by continuing the rotation of the reflecting mirror 4, measurement of the distance to the object to be measured which is in a predetermined range of angle can be accomplished continuously at a high speed by the use of the successive adjacent reflecting surfaces of the reflecting mirror 4.

Figure 4A:
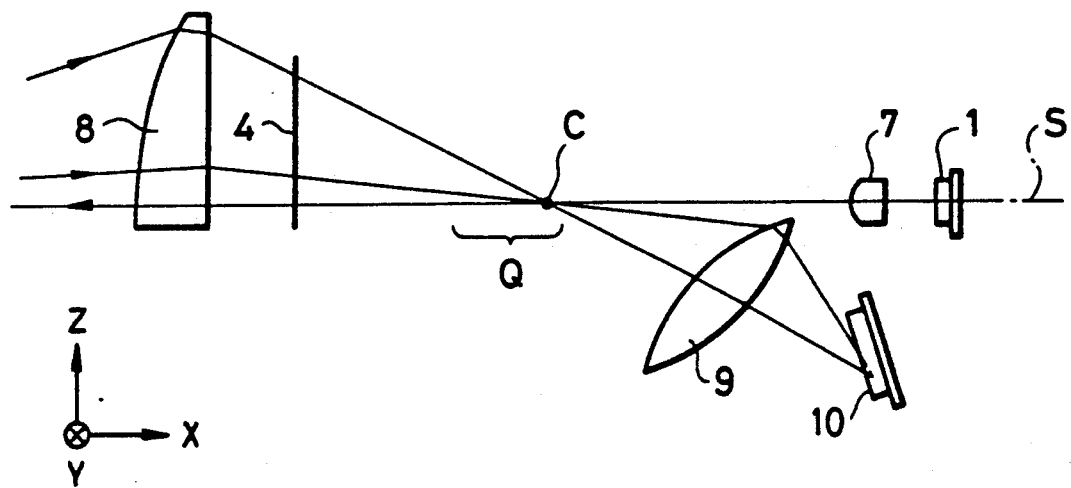
FIGS. 4(A) and 4(B) are schematic side views for illustrating another embodiment of the method of the present invention.
Figure 4B:
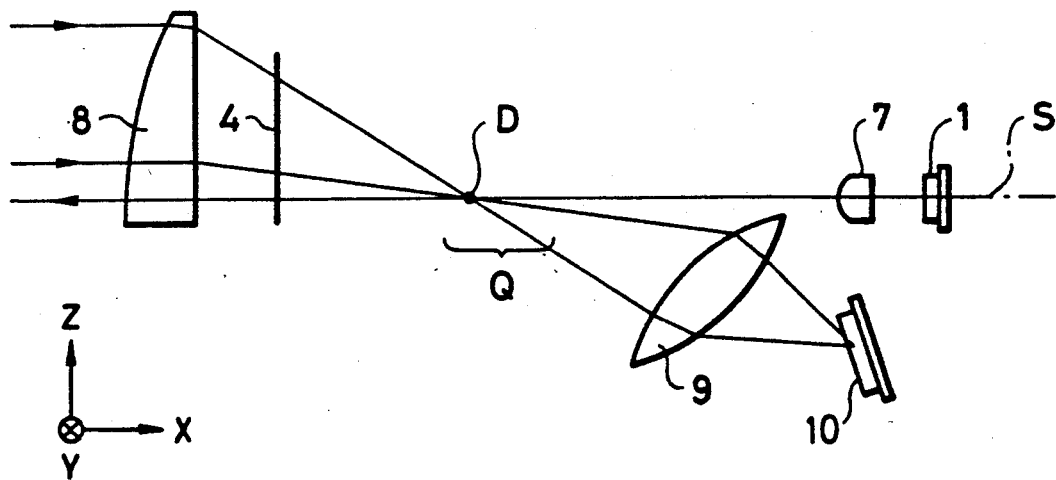
Figure 5:
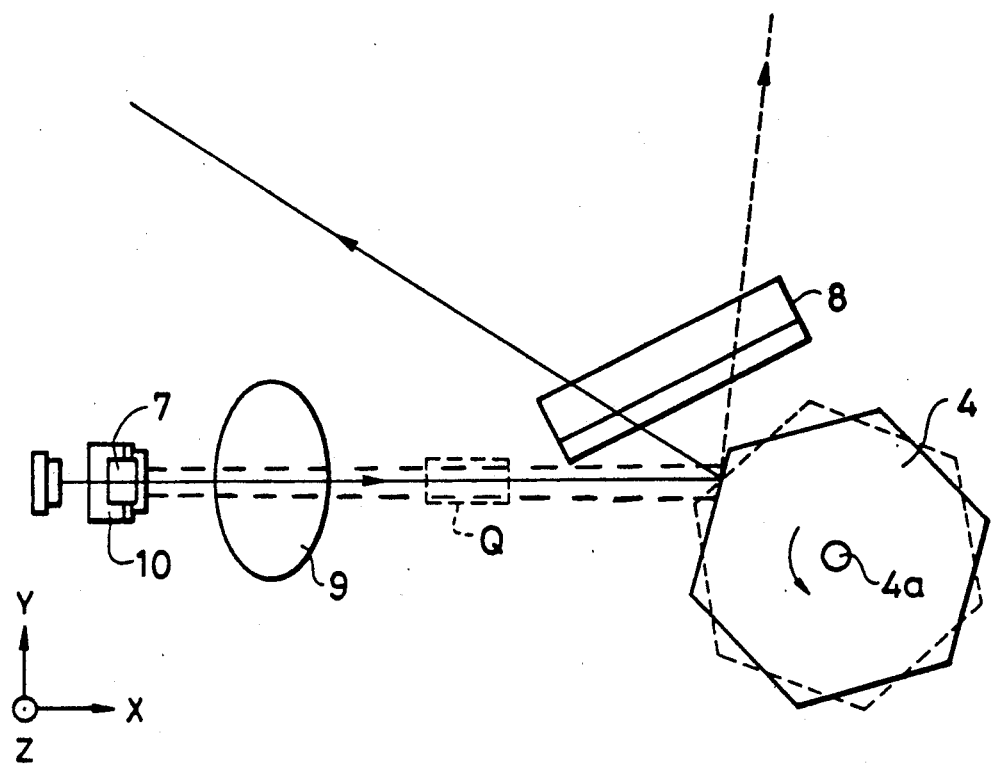
FIG. 5 is a schematic plan view thereof.

FIGS. 4(A) and 4(B) are schematic side views showing the second embodiment of the method of the present invention, and FIG. 5 is a schematic plan view thereof. In these Figures, members similar to those in FIGS. 1-3 are given similar reference numerals and need not be described here. In FIGS. 4-5, reference numeral 7 designates a convex cylindrical lens. The axial direction of the cylinder of this lens 7 (the direction of the bus line thereof) is a direction perpendicular to the plane of the drawing sheet of FIG. 4 (Y direction). Reference numberal 8 denotes a convex cylindrical lens. The axial direction of the cylinder of this lens 8 (the direction of the bus line thereof) is also a direction perpendicular to the plane of the drawing sheet of FIG. 4 (Y direction). Reference numberal 9 designates a convex lens and reference numeral 10 denotes a photoelectric converting element. The photoelectric converting element 10 is a position sensor similar to the above-mentioned photoelectric converting element 6, but in the present embodiment, it is not provided with the seal member 6l. The convex lens 9 and the photoelectric converting element 10 lie just below the optical path leading from the light source 1 to the rotary reflecting mirror 4 via the convex cylindrical lens 7. Also, in this optical system, the focus position of the convex cylindrical lens 7 and the focus position of the convex cylindrical lens 8 are coincident with each other.

The parallel light beam emitted from the light source 1 is converged at the focus position of the convex cylindrical lens 8 with respect only to the direction along the plane of the drawing sheet of FIG. 4 by the convex cylindrical lens 7 and is reflected by the rotary plane reflecting mirror 4, whereafter it enters the convex cylindrical lens 8 and is converged with respect only to the direction along the plane of the drawing sheet of FIG. 4 by the lens 8 and thus becomes a parallel light beam.

In the present embodiment, the sagittal plane (in FIG. 4, the plane perpendicular to the drawing sheet) S containing the optic axis of the convex cylindrical lens 7 and the optic axis of the convex cylindrical lens 8 will hereinafter referred to as the reference plane.

Thus, the parallel light beam passing through the convex cylindrical lens 8 is reflected by the surface of the object to be measured and part thereof passing through the convex cylindrical lens 8 and is converged thereby and imaged. The imaging position in this case differs depending on the distance to the object to be measured. FIG. 4(A) shows a case where the object to be measured (not shown) lies at a relatively short distance, and in this case, the light beam is imaged at a position C relatively distant from the reflecting surface of the reflecting mirror 4. FIG. 4(B) shows a case where the object to be measured (not shown) lies at a relatively long distance, and in this case, the light beam is imaged at a position D relatively near to the reflecting surface of the reflecting mirror 4. These imaging positions C and D both lie on the reference plane S. Also, by the action of the convex cylindrical lens 8, these imagings are effected with respect only to the vertical direction (Z direction) in FIG. 4. Accordingly, the image becomes linearly elongated in a direction perpendicular to the plane of the drawing sheet of FIG. 4 (Y direction).

The convex cylindrical lens 9 images a predetermined portion Q of the reference plane S (namely, a portion which contains the imaging positions C and D and which covers all positions in the range in which the reflected light beam from the object to be measured lying in the range of distance to be measured is imaged) on a photoelectric converting element 10. That is, the photoelectric converting element 10 is disposed at a position conjugate with the predetermined portion Q of the reference plane S with respect to the convex lens 9, and further, the light beam having passed from the object to be measured throught the convex cylindrical lens 8 to the reflecting surface of the reflecting mirror 4 and reflected thereby and imaged in said predetermined portion Q passes through the convex lens 9 to the photoelectric converting element 10.

Thus, the imaging position on the reference plane S can be known from the output of the photoelectric converting element 10, and the position of the object to be measured can be known from the imaging position. Thus, if the relation between the imaging position on the photoelectric converting element 10 and the distance to the object to be measured is determined in advance, the distance to the object to be measured can be immediately determined as the output of the photoelectric converting element 10.

As in the case of the first embodiment, the relation as described above is kept substantially the same even if the reflecting mirror 4 is rotated about the rotary shaft 4a. In the present embodiment, however, the image on the reference plane S is long in Y direction as described above and therefore, any deviation of the image position in the horizontal direction caused by the rotation of the reflecting mirror 4 will not substantially affect the detection of the imaging position.

In the above-described second embodiment, the image formed in the predetermined portion Q in the reference plane S is further formed on the photoelectric converting element 10 by the use of the convex lens 9, but alternatively, in the present invention, the photoelectric converting portion Q to effect measurement of the imaging position.

Figure 6:
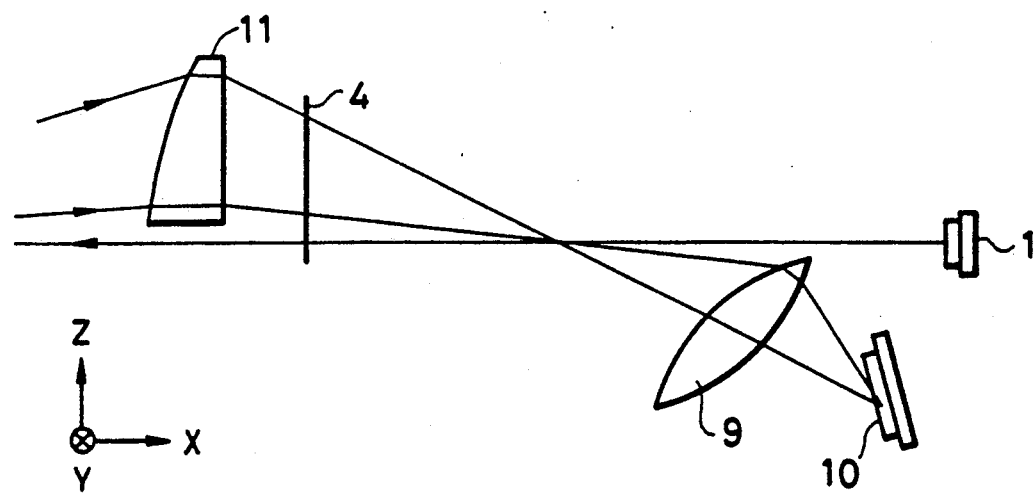
FIG. 6 is a schematic side view for illustrating a modification of the method shown in FIG. 4.

FIG. 6 is a schematic side view showing a third embodiment of the method of the present invention. In FIG. 6, members similar to those in FIG. 4 are given similar reference numerals and need not be described here.

The present embodiment is a modification of the second embodiment. In the present embodiment, a convex cylindrical lens 11 does not have a portion near the reference plane S and no convex cylindrical lens is present between the light source 1 and the rotary plane reflecting mirror 4. The parallel light beam emitted from the light source 1 is reflected by the rotary plane reflecting mirror 4, whereafter it is immediately projected onto the object to be measured. In the other points, the present embodiment is similar to the second embodiment.

According to the present embodiment, the number of components can be reduced.

In the present embodiment, the reflecting mirror comprises a rotatable polygon mirror, but in the present embodiment, the reflecting mirror may also be one comprising only one surface. In the case of a reflecting mirror such as a galvano mirror comprising only one surface, as in the above-described embodiments, rotation can be continued in the same direction to thereby continuously accomplish measurement of multi-direction distance and also, rotation can be made about the rotary shaft in a predetermined range of angle to thereby continuously accomplish measurement of multi-direction distance.

Also, in the method of the present invention, in order to distinguish between the extraneous light and the light beam from the light source to thereby increase S/N ratio and enhance measurement accuracy, an infrared ray emitting element may be used as the light source and a visible light intercepting filter may be placed forwardly of a photoelectric converting element for receiving the light from the infrared ray emitting element, and further the light source may be caused to emit modulated light and the output of the photoelectric converting element may be taken out in synchronism with the modulation.

Further, in the present invention, as shown in FIG. 1, a plane reflecting mirror may be disposed on the optical path projected from the condensing lens onto the object to be measured, and this plane reflecting mirror may be rotated about a rotary shaft non-parallel to the rotary shaft of the rotary plane reflecting mirror, whereby light beam scanning can be effected two-dimensionally and measurement of stereo multi-direction distance can be accomplished.

Furthermore, in the present invention, two axes orthogonal to each other may be set as the rotary shaft of the rotary plane reflecting mirror so that said mirror is two-dimensionally rotatable or pivotable, whereby two-dimensional light beam scanning can be accomplished.

Figure 7A:
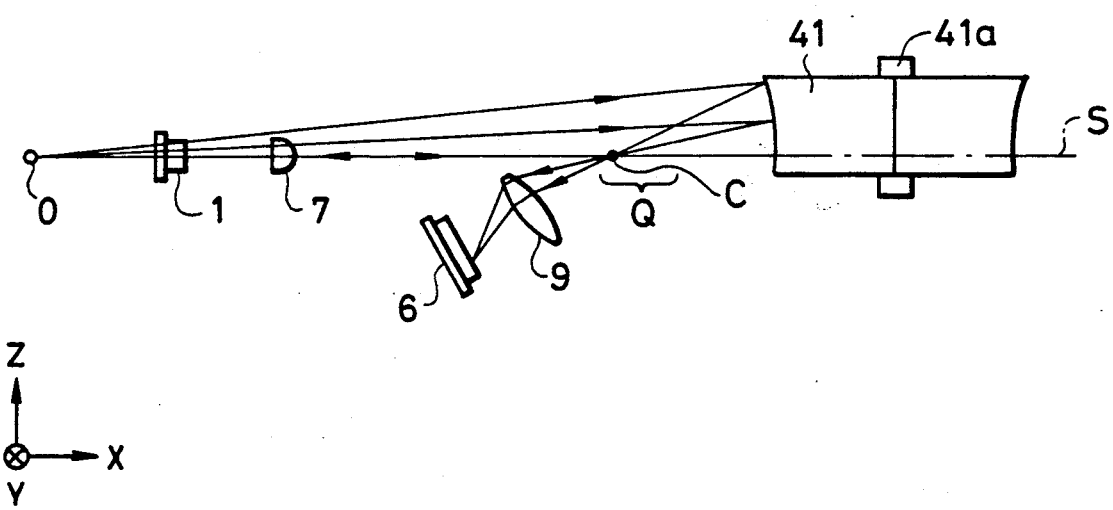
FIGS. 7(A) and 7(B) a schematic side views for illustrating a further embodiment of the method of the present invention.
Figure 7B:
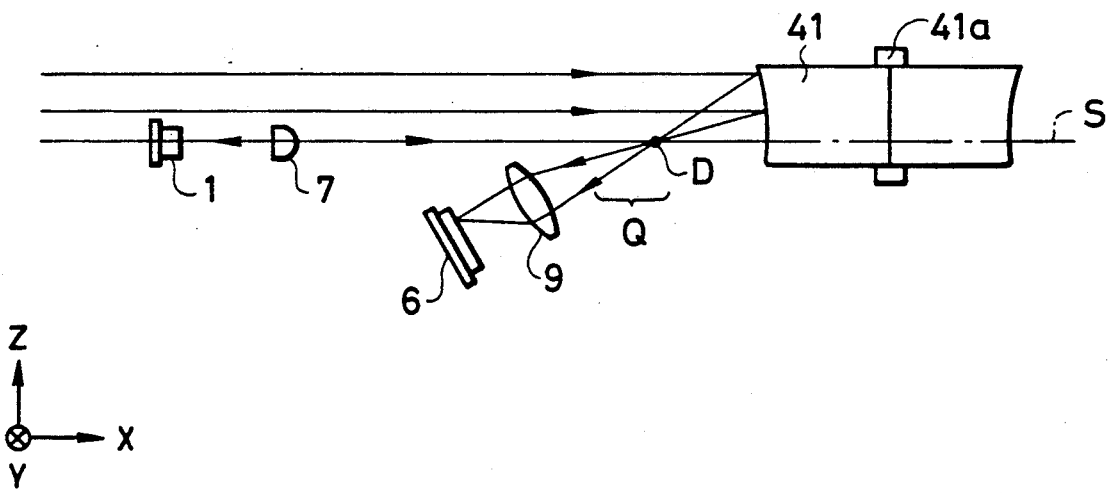
Figure 8:
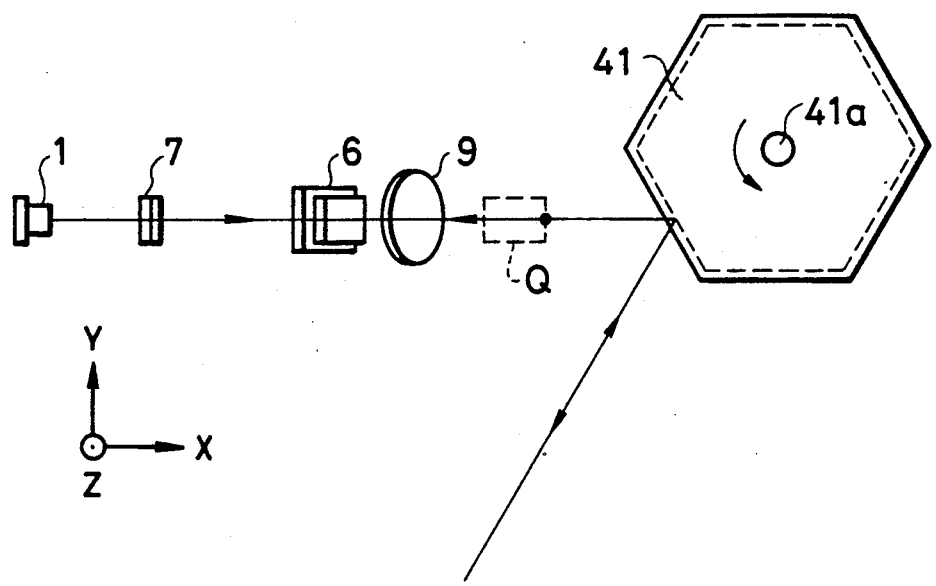
FIG. 8 is a schematic plan view thereof.

FIGS. 7(A) and 7(B) are schematic side views showing a fourth embodiment of the method of the present invention, and FIG. 8 is a schematic plan view thereof. In these Figures, as in FIG. 4, reference numeral 1 designates a light source which may be one using a light-emitting diode or a semiconductor laser in a light-emitting portion. Reference numeral 7 denotes a convex cylindrical lens. The axial direction of the cylinder (the direction of the generatrix) of the convex cylindrical lens 7 is Y direction, and the optic axis thereof is X direction. On the other hand, reference numeral 41 designates a concave rotary reflecting mirror having six reflecting surfaces. The reflecting mirror 41 is rotatably driven about a rotary shaft 41a extending in Z direction, and the reflecting surfaces thereof are positioned symmetrically with respect to the rotary shaft 41a. Each reflecting surface is formed into a concave cylindrical surface and the axial direction of the cylinder thereof is in a plane parallel to plane X-Y, and the optic axis of each reflecting surface also is in a plane parallel to plane X-Y. In these Figures, reference numeral 9 denotes a convex lens and reference numeral 6 designates a photoelectric converting element. This photoelectric converting element is a so-called position sensor whose output signal varies in conformity with the position at which a light spot is incident. The convex lens 9 and the photoelectric converting element 6 are present just below the optical path leading from the light source 1 to the concave reflecting mirror 41 via the convex cylindrical lens 7.

In FIG. 7A, the object 0 is located at a finite distance.

Figure 9:
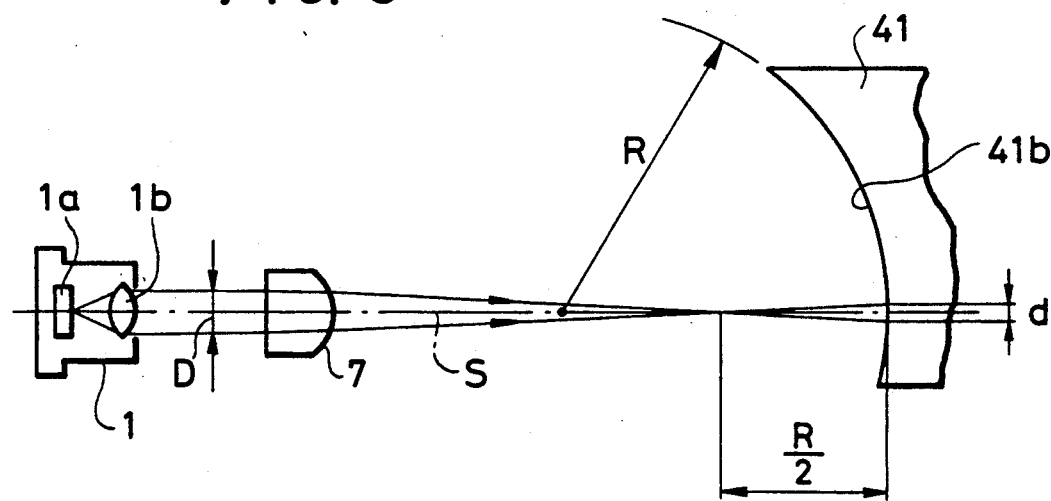
FIG. 9 shows the positional relation among a light source, a convex cylindrical lens and a concave rotary reflecting mirror in the embodiment shown in FIG. 8.

FIG. 9 is a schematic side view showing the positional relation among the light source 1, the convex cylindrical lens 7 and the concave rotary reflecting mirror 41 in the above-described embodiment. As shown, the light source 1 has a light-emitting portion 1a and a collimator lens 1b. The light beam emitted from the light-emitting portion 1a is collimated into a substantially parallel light beam of diameter D by the collimator lens 1b and enters the convex cylindrical lens 7. This cylindrical lens converges the light beam with respect only to Z direction. As shown in FIG. 9, the focus position of the convex cylindrical lens 7 is placed at a position spaced apart from the concave cylindrical reflecting surface 41b by one half of the radius of curvature R of the reflecting surface 41b (i.e., the focus position of the reflecting surface 41b). Accordingly, the light beam from the convex cylindrical lens 7 enters the concave cylindrical reflecting surface 41b of the reflecting mirror 41 while becoming a light beam of elliptical cross-section having a diameter D in Z direction and a diameter D in a direction orthogonal to Z direction. The parallel light beam having said elliptical cross-section is reflected from the reflecting surface 41b and projected onto the object to be measured, not shown.

In FIG. 7, the plane X-Y containing the optic axis of the convex cylindrical lens 7 and the optic axes of the concave cylindrical reflecting surfaces 41b of the concave reflecting mirror 41, i.e., the sagittal plane S, will hereinafter be referred to as the reference plane S in the present embodiment as well.

Thus, the parallel light beam reflected by the reflecting surface 41b of the reflecting mirror 41 is reflected by the surface of the object to be measured and a part thereof returns to the reflecting surface of the reflecting mirror 41 and is reflected and imaged by that reflecting surface. The imaging position in this case differs depending on the distance to the object to be measured. FIG. 7(A) shows a case where the object to be measured (not shown) is at a relatively short distance, and in such case, the light beam is imaged at a position C relatively distant from the reflecting surface 41b of the reflecting mirror 41. FIG. 7(B) shows a case where the object to be measured (not shown) is at a relatively long distance, and in such case, the light beam is imaged at a position D relatively near to the reflecting surface 41b of the reflecting mirror 41. These imaging positions C and D both are on the reference plane S. These imagings are effected with respect only to Z direction by the action of the convex cylindrical lens 7. Accordingly, the image becomes linearly long in the horizontal direction, i.e., in Y direction.

The convex lens 9 images a predetermined portion Q of the reference plane S (i.e., a portion which contains the imaging positions C and D and covers all positions in the range in which the reflected light beam from the object to be measured lying in the range of distance to be measured is imaged) on the photoelectric converting element 6. That is, the photoelectric converting element 6 is disposed at a position conjugate with the predetermined portion Q of the reference plane S with respect to the convex lens 9, and the light beam which has entered the reflecting surface 41b of the reflecting mirror 41 from the object to be measured and has been reflected thereby and imaged in said predetermined portion Q and passes through the convex lens 9 to the photoelectric converting element 6.

Accordingly, the imaging position of the reflected light beam on the reference plane S can be known from the output of the photoelectric converting element 6, and the position of the object to be measured can be known from said imaging position. Thus, if the relation between the imaging position on the photoelectric converting element 6 and the distance to the object to be measured is determined in advance, the distance to the object to be measured ca be immediately determined as the output of the photoelectric converting element 6.

The relation as described above will be kept substantially the same even if the reflecting mirror 41 is rotated about the rotary shaft 41a. Accordingly, the distance to the object to be measured lying in a predetermined range of angle on the reference plane S can be measured by rotating the reflecting mirror 41. Also, when the reflecting mirror 41 is rotated, the imaging position on the reference plane S will strictly deviate in the horizontal direction because the reflecting mirror 41 itself is rotated by a certain angle within the time until the reflected light from the object to be measured arrives at the reflecting surface 41b of the reflecting mirror 41, but the image on the reference plane is long in the Y direction as described above and therefore does not substantially affect the detection of the imaging position by the photoelectric converting element 6.

Again in the present embodiment, by continuing the rotation of the reflecting mirror 41, measurement of the distance to the object to be measured lying in a predetermined range of angle can be accomplished continuously at a high speed by the use of the successive adjacent reflecting surfaces of the reflecting mirror 41.

In the above-described embodiment, the shape of the reflecting surface of the reflecting mirror is circularly cylindrical, but in the present invention, the shape of the reflecting surface may also be elliptically cylindrical or parabolically cylindrical.

Further, in the above-described embodiment, the reflecting mirror comprises a rotatable polygon mirror, but in the present invention, as previously described, the reflecting mirror may also be a reflecting mirror such as a galvano mirror comprising only one surface. In the case of a reflecting mirror comprising only one surface, as in the above-described embodiment, rotation may be continued in the same direction to thereby accomplish multi-direction distance measurement or the reflecting mirror may be pivoted about the rotary shaft in a predetermined range of angle to thereby continuously accomplish multi-direction distance measurement.

In the above-described embodiment, the image formed in the predetermined portion Q in the reference plane S is further formed on the photoelectric converting element 6 by the use of the convex lens 5, but in the present invention, measurement of the imaging position may also be effected with the photoelectric converting element 6 being disposed in said predetermined portion Q.

Also in the method of the present invention, in order to distinguish between the extraneous light and the light beam from the light source and increase S/N ratio and enhance measurement accuracy, an infrared ray emitting element may be used as the light source and a visible light interecepting filter may be placed forwardly of a photoelectric converting element for receiving the light from the infrared ray emitting element, or the light source may be caused to emit modulated light and the output of the photoelectric converting element may be transmitted in synchronism with said modulation.

Further, in the present invention, a plane reflecting mirror may be disposed on the optical path projected from the concave reflecting mirror onto the object to be measured, and this plane reflecting mirror may be rotated about a rotary shaft non-parallel to the rotary shaft of the concave reflecting mirror, whereby measurement of stereo multi-direction distance can be accomplished.

According to the present invention as described above, the result of multi-direction distance measurement can be immediately obtained as a time-serial electrical signal and a complicated operating process is not required and therefore, high-speed measurement can be accomplished by a relatively simple construction.

Also, according to the present invention, the result of measurement can be obtained by the measurement of the position of the optically formed image and therefore, the resolving power can be readily improved by enchancing the accuracy of the optical system.

Further, the present invention is simple in construction and can therefore be made easily and inexpensively, and compactness of the apparatus can also be achieved.

We claim:

1. A distance measuring apparatus comprising:
   a light source;
   a rotatable multi-surface reflecting mirror for continuously scanning an object with a light from said light source, said mirror having a plurality of reflecting surfaces for reflecting the light toward the object and receiving the light reflected by the object, such that the light reflected by one of said surfaces is received on the same one of said surfaces;
   an optical system for converting the reflected light reflected by said reflecting surface into collimated light and directing the collimated light toward the object, and condensing the light reflected by the object and directing it to said reflecting surface; and
   light-receiving means for receiving the light reflected by said reflecting surface which receives the light from the object, said light-receiving means having a predetermined light-receiving surface, wherein a distance from a predetermined point to the object is measured on the basis of a position where the reflected light enters said light-receiving surface.

2. A distance measuring apparatus comprising:
   a radiation source emitting a radiation beam;
   a scanning system for scanning an object to be detected with a radiation beam from said radiation source, said scanning system having a rotatable reflecting mirror for reflecting the radiation beam from said radiation source and an optical system for receiving said radiation beam reflected by said reflecting mirror to convert it into a substantially parallel beam and for directing said parallel beam to the object wherein the object is scanned with said parallel beam by rotating said mirror; and
   a detecting system for receiving a beam reflected from the object, passing back through said optical system and said reflecting mirror, wherein said reflected beam is converged and directed to said reflecting mirror by said optical system and is reflected by said reflecting mirror to enter said detecting system, said detecting system having conversion means for converting said reflected beam into a signal corresponding to the distance to the object based on a position where the reflected beam enters said conversion means.

3. A distance measuring apparatus according to claim 2, wherein said detecting system further includes lens means for substantially focusing the reflected beam from said reflecting mirror on said conversion means.

4. A distance measuring apparatus according to claim 2, wherein said optical system includes a cylindrical lens.

5. A distance measuring apparatus according to claim 4, wherein said conversion means includes a position sensor for outputting a signal corresponding to the incident position of said reflected beam entering thereon, wherein said reflected beam is linearly focused on said position sensor by said cylindrical lens and wherein said cylindrical lens and said position sensor are set so that the longitudinal direction of said linear shaped reflected beam is substantially perpendicular to its shifting direction.

6. A distance measuring apparatus according to claim 2, wherein said reflecting mirror includes a predetermined reflecting surface and wherein the radiation beam from said radiation source and the reflected beam from the object are reflected by said predetermined reflecting surface.

7. A distance measuring apparatus according to claim 6, wherein said reflecting mirror comprises a rotating polygon mirror.

8. A distance measuring apparatus according to claim 7, wherein said radiation source includes an LED.

9. A distance measuring apparatus according to claim 7, wherein said radiation source includes a semiconductor laser.

10. A distance measuring apparatus according to claim 2, wherein said radiation source adjustably emits a light beam in synchronization with the signal output from said conversion means.

11. A distance measuring apparatus according to claim 2, wherein said radiation source emits an infrared beam.

12. A distance measuring apparatus according to claim 2, wherein said scanning system includes a plurality of rotatable reflecting mirrors so as to scan in different directions from one another with the radiation beam from said radiation source.

13. A distance measuring apparatus comprising:
a radiation source emitting a radiation beam;
a scanning system for scanning an object to be detected with a radiation beam from said radiation source, said scanning system including a rotatable reflecting mirror for reflecting the radiation beam from said radiation source, said reflecting mirror having a concave curved reflecting surface for converting the radiation beam into a substantially parallel beam, wherein the object is scanned by rotating said reflecting mirror; and
a detecting system for receiving a beam reflected from the object and through concave curved reflecting surface, wherein said reflected beam is reflected and converged by said concave curved reflecting surface to enter said detecting system, said detecting system having conversion means for converting said reflecting beam into a signal corresponding to a position where the reflected beam enters thereon.

14. A distance measuring apparatus according to claim 13, wherein said detecting system further includes lens means for substantially focusing the reflected beam from said reflecting mirror on said conversion means.

15. A distance measuring apparatus according to claim 13, wherein said conversion means includes a position sensor for outputting a signal corresponding to the incident position of said reflected beam entering thereon, said concave curved reflecting surface linearly focuses the reflected beam on said position sensor, and wherein the longitudinal direction of said linearly reflected beam is substantially perpendicular to its shifting direction.

16. A distance measuring apparatus according to claim 13, wherein said reflecting mirror comprises a rotating polygon mirror.

17. A distance measuring apparatus according to claim 16, wherein said radiation source includes an LED.

18. A distance measuring apparatus according to claim 16, wherein said radiation source includes a semiconductor laser.

19. A distance measuring apparatus comprising:
a radiation source for emitting a parallel beam;
a scanning system for scanning an object to be detected with said parallel beam, said scanning system including a rotatable reflecting mirror for reflecting said parallel beam from said radiation source, when the object is scanned with said parallel beam by rotating said reflecting mirror; and
a detecting system for receiving a beam reflected from the object, said detecting system including a converging optical system, disposed between the object and said reflecting mirror, and conversion means, said converging optical system converging said reflected beam to direct it to said reflecting mirror and being incident on said conversion means, wherein said conversion means converts said reflected beam into a signal corresponding to a position where the reflected beam enters thereon.

* * * * *

UNITED STATES PATENT AND TRADEMARK OFFICE
CERTIFICATE OF CORRECTION

PATENT NO. : 5,033,845

DATED : July 23, 1991

INVENTOR(S) : Kanehiro Sorimachi, et al.

It is certified that error appears in the above-identified patent and that said Letters Patent is hereby corrected as shown below:

Title Page:
[63] RELATED U.S. APPLICATION DATA

Line 1, Ser. No. 916,727, Oct. 7, 1986" should read --Ser. No. 916,327, Oct. 7, 1986--.

COLUMN 1:

Line 26, "recognizion" should read --recognizing--.

COLUMN 4:

Line 59, "number 61." should read --member 61a.--.

Line 63, "lens 7." should read --lens 6.--.

COLUMN 6:

Line 8, "converting portion Q" should read --converting element may be disposed in said predetermined portion Q--.

COLUMN 8:

Line 36, "Ca" should read --can--.

UNITED STATES PATENT AND TRADEMARK OFFICE
CERTIFICATE OF CORRECTION

PATENT NO. : 5,033,845

DATED : July 23, 1991

INVENTOR(S) : Kanehiro Sorimachi, et al.

It is certified that error appears in the above-identified patent and that said Letters Patent is hereby corrected as shown below:

COLUMN 11:

Line 15, "through" should read --through said--.

Line 20, "reflecting beam" should read --reflected beam--.

Line 21, "to" should read --to the distance to the object based on--.

Line 22 "thereon" should read --said conversion means--.

COLUMN 12:

Line 30, "to" should read --to the distance to the object based on--.

Line 31, "thereon" should read --said conversion means--.

Signed and Sealed this

Fourth Day of May, 1993

Attest:

MICHAEL K. KIRK

Attesting Officer

Acting Commissioner of Patents and Trademarks